(12) United States Patent
Benedyk et al.

(10) Patent No.: US 8,358,650 B2
(45) Date of Patent: Jan. 22, 2013

(54) METHODS, SYSTEMS, AND COMPUTER PROGRAM PRODUCTS FOR COMMUNICATING CALLING NAME (CNAM) SERVICES FOR SESSION INITIATION PROTOCOL (SIP) ORIGINATED CALLS TERMINATING IN A CIRCUIT SWITCHED NETWORK

(75) Inventors: Robby Benedyk, Angier, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 668 days.

(21) Appl. No.: 12/541,041

(22) Filed: Aug. 13, 2009

(65) Prior Publication Data
US 2010/0040049 A1 Feb. 18, 2010

Related U.S. Application Data

(60) Provisional application No. 61/088,701, filed on Aug. 13, 2008.

(51) Int. Cl.
*H04L 12/66* (2006.01)
*H04L 12/28* (2006.01)
(52) U.S. Cl. .............. 370/356; 370/392; 379/221.09
(58) Field of Classification Search .................. None
See application file for complete search history.

(56) References Cited

U.S. PATENT DOCUMENTS

| 6,944,184 | B1* | 9/2005 | Miller et al. | 370/467 |
| 6,954,526 | B1* | 10/2005 | Glenn et al. | 379/220.01 |
| 2006/0209791 | A1* | 9/2006 | Khadri et al. | 370/352 |
| 2006/0280165 | A1* | 12/2006 | Blumenschein et al. | 370/352 |
| 2007/0121908 | A1 | 5/2007 | Benedyk et al. | |
| 2008/0090569 | A1 | 4/2008 | Khan et al. | |

FOREIGN PATENT DOCUMENTS

WO WO 2010/019815 A2 2/2010

OTHER PUBLICATIONS

Notification of Transmittal of the International Search Report and the Written Opinion of the International Searching Authority, or the Declaration for International Application No. PCT/US2009/053775 (Apr. 14, 2010).

* cited by examiner

*Primary Examiner* — Melanie Jagannathan
(74) *Attorney, Agent, or Firm* — Jenkins, Wilson, Taylor & Hunt, P.A.

(57) ABSTRACT

Methods, systems, and computer program products for communicating CNAM services for SIP originated calls terminating in a circuit switched network is described. In one embodiment, the method includes, at a SIP-SS7 gateway, receiving a SIP call setup message that includes a SIP calling subscriber identifier information, associating a temporary telephone number with the SIP calling subscriber identifier information, generating an SS7 call setup message associated with the SIP call setup message, wherein the SS7 call setup message includes the temporary telephone number, and communicating the temporary telephone number and SIP calling subscriber identifier information to a calling name interworking function (CIF) module. The method also includes, at the CIF module, storing the temporary telephone number and the associated SIP calling subscriber identifier information in a local cache, receiving a CNAM query message containing the temporary telephone number from a terminating switching office, and transmitting a CNAM response message to the terminating switching office including the SIP calling subscriber identifier information.

27 Claims, 10 Drawing Sheets

METHODS, SYSTEMS, AND COMPUTER PROGRAM PRODUCTS FOR COMMUNICATING CALLING NAME (CNAM) SERVICES FOR SESSION INITIATION PROTOCOL (SIP) ORIGINATED CALLS TERMINATING IN A CIRCUIT SWITCHED NETWORK

PRIORITY CLAIM

This application claims the benefit of U.S. Provisional Patent Application No. 61/088,701, filed on Aug. 13, 2008, the disclosure of which is incorporated herein by reference in its entirety.

TECHNICAL FIELD

The subject matter described herein relates to CNAM identification services and SIP originated calls in a communications network. More particularly, the subject matter described herein relates to methods, systems, and computer program products for communicating CNAM services for SIP originated calls terminating in a circuit switched network.

BACKGROUND

Presently, many telecommunication service providers have configured their respective signaling networks to support SIP communications by utilizing various gateways and softswitches (e.g., a SIP-SS7 gateway). In order to facilitate the integration of SIP-SS7 signaling in a given network, any supported features must be compatible with existing legacy network components and equipment (e.g., terminating switching offices). However, some telecommunication features may be incompatible due to the configurations that exist at the legacy network equipment. For example, features such as CNAM services are not necessarily compatible with a circuit switched network when the originating call is made from a SIP telephone. Notably, each of the existing terminating switching offices (e.g., SSPs, MSCs, etc.) may send specifically formatted CNAM queries to conventional CNAM databases. The conventional CNAM query mechanism is not compatible with SIP calling parties because SIP utilizes a SIP subscriber address (e.g., a uniform resource identifier), which is not recognizable by the legacy equipment, instead of a calling party number, which is recognizable by the legacy equipment. Accordingly, in light of these disadvantages associated with existing legacy configurations and capabilities, there exists a need for methods, systems, and computer readable media for communicating CNAM services for SIP originated calls terminating in a circuit switched network.

SUMMARY

According to one aspect, the subject matter described herein comprises methods, systems, and computer for communicating CNAM services for SIP originated calls terminating in a circuit switched network is described. In one embodiment, the method includes, at a SIP-SS7 gateway, receiving a SIP call setup message that includes SIP calling subscriber identifier information, associating a temporary telephone number with the SIP calling subscriber identifier information, generating an SS7 call setup message associated with the SIP call setup message, wherein the SS7 call setup message includes the temporary telephone number, and communicating the temporary telephone number and SIP calling subscriber identifier information to a calling name interworking function (CIF) module. The method also includes, at the CIF module, storing the temporary telephone number and the associated SIP calling subscriber identifier information in a local cache, receiving a CNAM query message containing the temporary telephone number from a terminating switching office, and transmitting a CNAM response message to the terminating switching office including the SIP calling subscriber identifier information.

The subject matter described herein for communicating CNAM services for SIP originated calls terminating in a circuit switched network may be implemented using a computer readable medium having stored thereon executable instructions that when executed by the processor of a computer control the computer to perform steps. Exemplary computer readable media suitable for implementing the subject matter described herein includes disk memory devices, chip memory devices, programmable logic devices, and application specific integrated circuits. In one implementation, the computer readable medium may include a memory accessible by a processor. The memory may include instructions executable by the processor for implementing any of the methods for communicating CNAM services described herein. In addition, a computer readable medium that implements the subject matter described herein may be located on a single device or computing platform or may be distributed across multiple physical devices and/or computing platforms.

BRIEF DESCRIPTION OF THE DRAWINGS

The subject matter described herein will now be explained with reference to the accompanying drawings of which.

DETAILED DESCRIPTION

Figure 1:
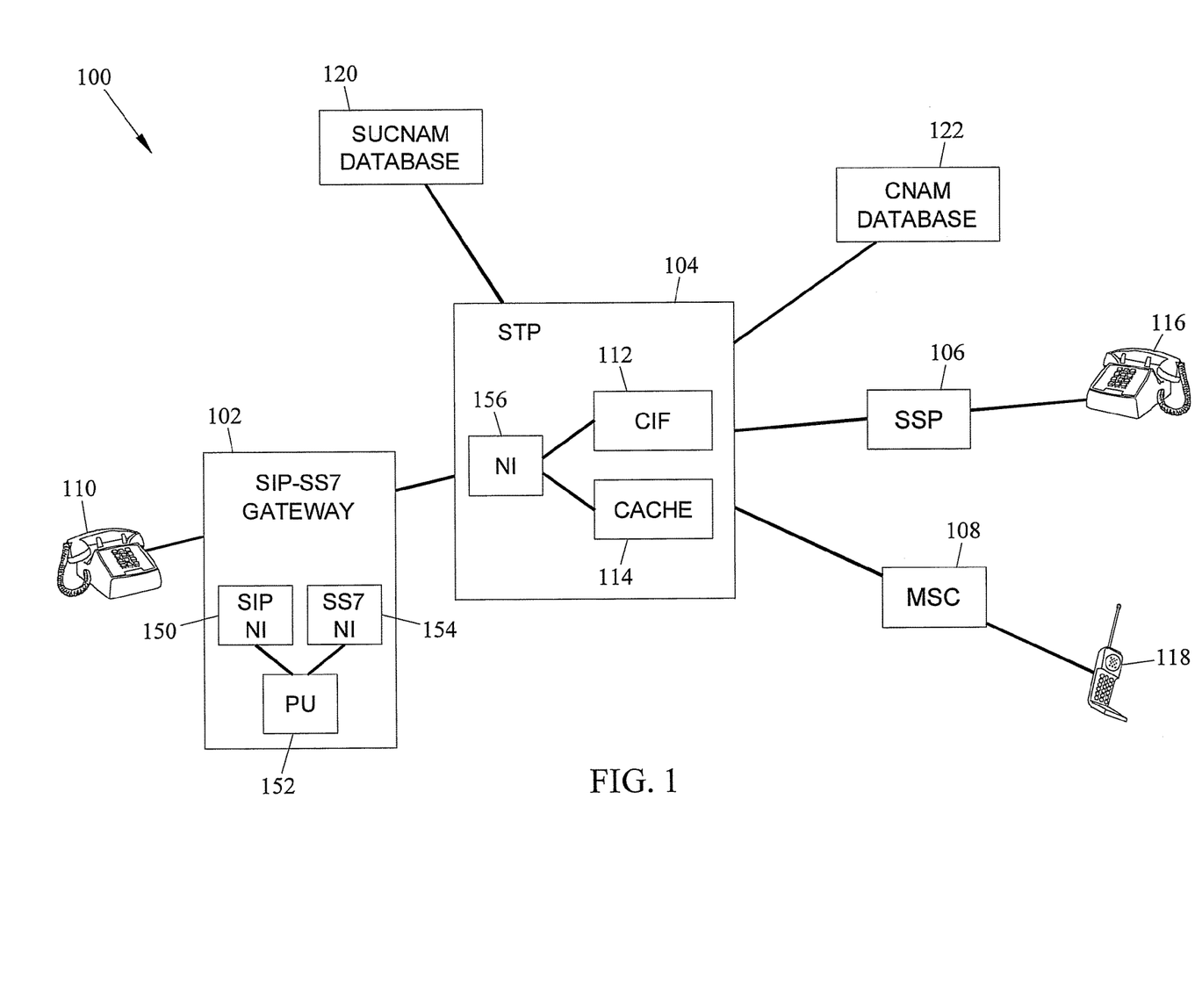
FIG. 1 is a network diagram of an exemplary communications system configuration including a signal transfer point provisioned with a CNAM interworking function for communicating CNAM services for SIP originated calls terminating in a circuit switched network according to an embodiment of the subject matter described herein.

The present subject matter relates to systems, methods, and computer program products for communicating calling name (CNAM) services for session initiation protocol (SIP) originated calls terminating in a circuit switched network, such as a public switched telephone network (PSTN). FIG. 1 illustrates an exemplary network 100 that comprises a SIP-SS7 gateway 102, a signal transfer point (STP) 104, a service switching point (SSP) 106, a mobile switching center (MSC) 108, a SIP-URI CNAM database 120, a CNAM database 122, an originating SIP endpoint device 110, a terminating endpoint device 116, and a mobile device 118. In one embodiment, SIP-SS7 gateway 102 may be embodied as a softswitch. In yet another embodiment, SIP-SS7 gateway 102 and STP 104 may be embodied as a single network routing node capable of performing the respective functions. In the illustrated example, SIP-SS7 gateway 102 includes a SIP network interface 150 that receives SIP call setup messages that include SIP calling subscriber identifier information. SIP-SS7 gateway 102 includes a processing unit 152 for generating a telephone number, associating the telephone number with the SIP calling subscriber identifier, generating a second call setup message associated with the SIP call setup message, and communicating the telephone number and the SIP calling subscriber identifier information to CNAM interworking function module.

STP 104 may also include a network interface 156 that receives the telephone number and the associated SIP calling subscriber identifier information from SIP-SS7 gateway 102. Network interface 156 may be any suitable network interface capable of receiving such information over a network. In one example, network interface 156 may be an SS7 network interface 154 that receives SS7 call setup messages sent via SS7 MTP or IP transport.

Figure 2:
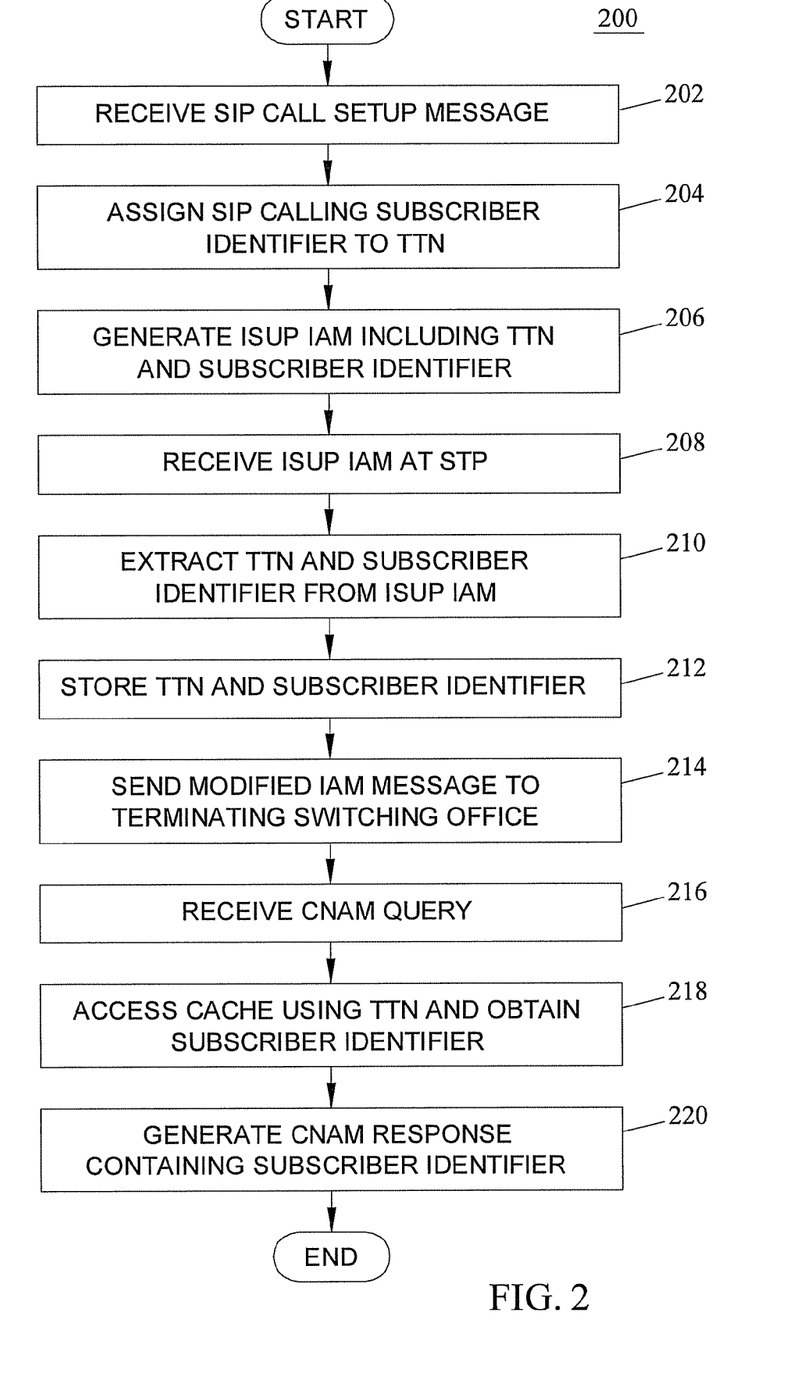
FIG. 2 is a flow chart depicting an exemplary method for communicating CNAM services for SIP originated calls terminating in a circuit switched network according to an embodiment of the subject matter described herein.

To better illustrate the communication of CNAM services for SIP originated calls that terminate in a circuit switched network 100, the following description refers to FIG. 1 and FIG. 2 interchangeably. Namely, FIG. 2 is a flow chart of a method 200 for communicating CNAM services for SIP originated calls terminating in a circuit switched network. In one embodiment, method 200 may be performed by a processor executing instructions stored on a computer readable medium (e.g., a processing unit on an STP or other network element).

In block 202, a SIP call setup message is received. In one embodiment, SIP-SS7 gateway 102 receives a SIP INVITE message from SIP endpoint device 110. SIP-SS7 gateway 102 may include a softswitch, a media gateway controller, or any other gateway element capable of processing messages between the SIP and SS7 protocols. Although the following description and FIGS. 1-10 illustrate a SIP-SS7 STP 104, any other SIP gateway or softswitch identifier), such as a SIP subscriber address (e.g., a SIP URI), a SIP subscriber's name (e.g., Robby Benedyk), a subscriber's city/state, a subscriber attribute (e.g., "telemarketer", "cellular", etc.), or the like. The SIP INVITE also includes the called party telephone number. The SIP calling subscriber identifier may include at least one of the subscriber's name or the subscriber's SIP address.

In block 204, the SIP calling subscriber identifier is assigned to a temporary telephone number (TTN). In one embodiment, a processing unit in SIP-SS7 gateway 102 assigns a TTN, which may be a "dummy number," to the SIP calling subscriber identifier in the SIP INVITE message. Notably, a "temporary telephone number" is a number arbitrarily assigned by gateway 102 that only has significance to CNAM interworking function (CIF) 112 (as explained below). The TTN may include any number of digits, but is typically 7-15 digits in length so as to resemble a traditional circuit switched telephone number (e.g., public switched telephone network (PSTN), global system for mobile communications (GSM) cellular network, etc.). The assignment (i.e., mapping) of the SIP calling subscriber identifier to the TTN forms an association which may be ultimately stored in a local cache communicatively coupled to a serving STP, or an external database. Both the local cache and the external database may be accessible by a CNAM interworking function (CIF) 112 of the present subject matter. In one embodiment, the external database may include a service control point (SCP) database, or any other suitable database/storage structure (e.g., SIP-URI CNAM database 120).

In block 206, an ISUP IAM that includes the TTN in the calling party field is generated. In one embodiment, the processing unit in SIP-SS7 gateway 102 generates an ISUP IAM that includes the TTN as the calling party number as well as the SIP subscriber's name (i.e., the calling party's name). The SIP calling subscriber identifier may be appended to other non-CNAM information and stored in a parameter or field value in the IAM message, or the SIP subscriber identifier may be stored in a parameter or field in the IAM message that is dedicated to conveying SIP subscriber identifier information. Gateway 102 then directs the ISUP IAM towards a terminating end office associated with the called party. In an alternate embodiment, a call setup message of a different signaling protocol may be used instead of an ISUP IAM (i.e., the present subject matter is not limited to the use of ISUP messages).

In block 208, the ISUP IAM is received by STP 104 from SIP-SS7 gateway 102. In one embodiment, a network interface of STP 104 receives the ISUP IAM. STP 104 may be configured to examine the received IAM message and recognize the TTN and process the call setup message, accordingly.

In block 210, the TTN and subscriber identifier are extracted from the ISUP IAM. In one embodiment, CIF module 112 is configured to extract the SIP calling subscriber identifier and the TTN from the received ISUP IAM.

In block 212, the TNN and subscriber identifier are stored. In one embodiment, CIF module 112 is configured to store the TTN and the associated SIP calling subscriber identifier (e.g., the SIP subscriber's name, the SIP subscriber's SIP address, or other SIP URI) in a local cache 114 associated with or accessible by STP 104. Alternatively, the TTN and the associated SIP calling subscriber identifier may be stored together in a separate database such as a SIP-URI CNAM database 120 or an ENUM database, which is located externally from STP 104.

In block 214, the IAM message is modified to remove the SIP subscriber identifier information, and the modified IAM message is routed to the terminating switching office (e.g., SSP 106 or MSC 108). It will be appreciated that, as described herein, modifying the received ISUP IAM message to remove the SIP subscriber identifier information may include generating a second IAM that includes the TTN but not the SIP subscriber identifier.

In block 216, a CNAM query message is received. In one embodiment, STP 104 receives or intercepts an IN/AIN CNAM query message from the terminating switching office intended for a CNAM database (e.g., database 122). Although FIGS. 2-12 depict an IN/AIN CNAM query, any CNAM query message may be used without departing from the scope of the present subject matter. The CNAM query message includes the TTN as the calling party number. In one embodiment, the CNAM query message may comprise a TCAP message.

In block 218, a local cache is accessed using the TTN to obtain the subscriber identifier. In one embodiment, CIF module 112 uses the TTN from the received CNAM query message to access cache 114 and obtain the associated SIP calling subscriber identifier stored therein. In an alternate embodiment, CIF module 112 may use a secondary query/response mechanism to access an external SUCNAM database 120 to obtain the SIP calling subscriber identification information (i.e., if the SUCNAM database 120 has been previously provisioned with the subscriber identifier information). In one embodiment, SUCNAM database 120 may include any database that is configured to store SIP subscriber calling name information associated with a SIP URI (e.g., a SIP calling subscriber address). A SUCNAM database may also contain other calling subscriber information including, but not limited to, a uniform resource identifier (URI), a subscriber name, a city, a state, a country, calling party type identification information, etc. Calling party type identification information may include information that generally or specifically identifies the type of caller. Exemplary calling party type identifiers may include, but are not limited to tags that identify "telemarketer", "residential", "wireless", "emergency", "pollster", "charity", and other types or classifications of callers.

In block 220, a CNAM response message containing the subscriber identifier information is generated. In one embodiment, CIF module 112 generates a CNAM IN/AIN response that contains the SIP calling subscriber name information obtained from secondary SUCNAM query transaction. The CNAM response message is then transmitted to the terminating switching office that made the original CNAM query/request.

Figure 3:
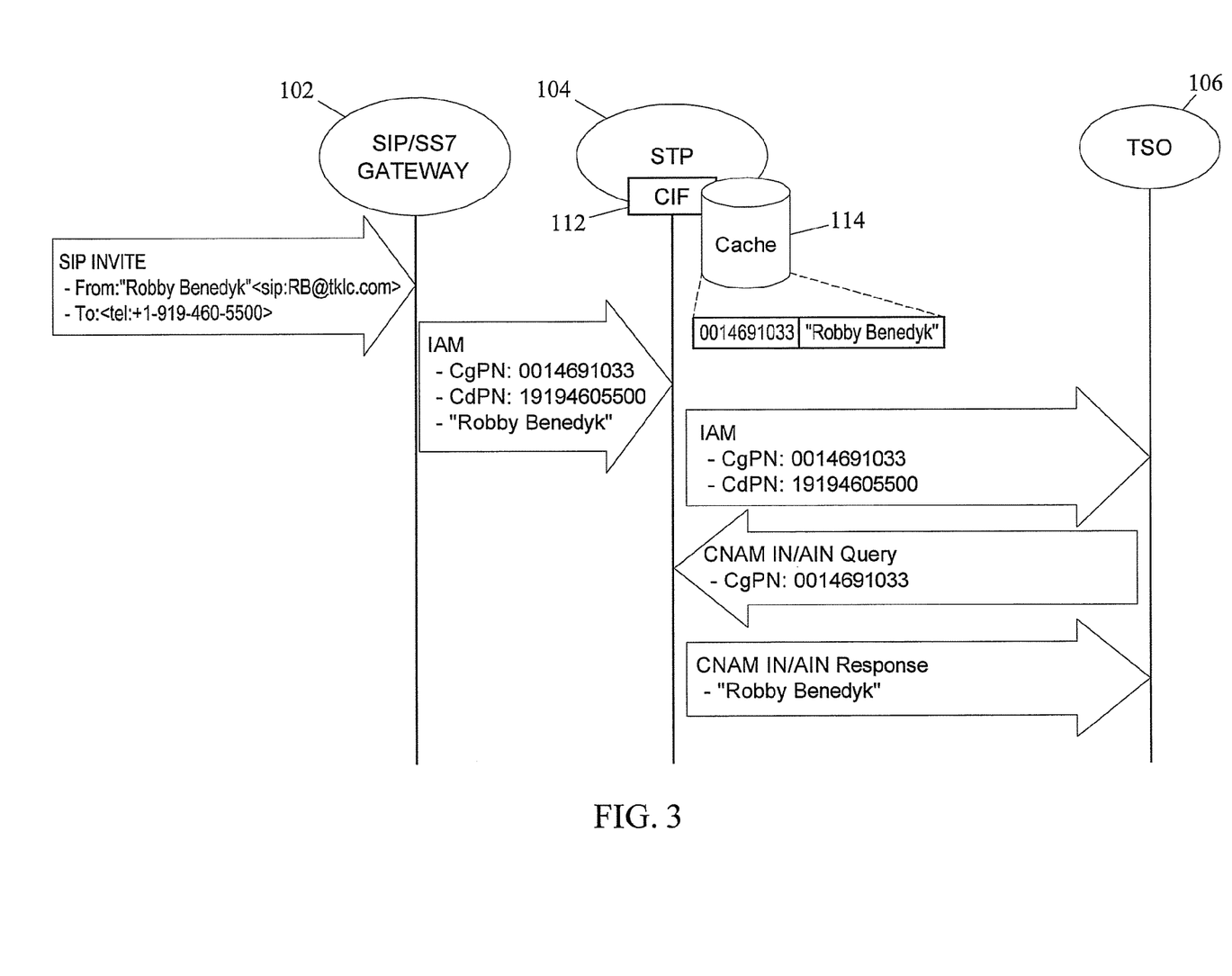
FIG. 3 is a call flow diagram of communicating CNAM services for SIP originated calls terminating in a circuit switched network using a local cache according to an embodiment of the subject matter described herein.

FIG. 3 depicts a call flow diagram of one embodiment of the present subject matter. In this embodiment, CIF 112 is integrated with, associated with, or co-located with a routing node, such as a signal transfer point (STP) 104. In alternate embodiments, CIF 112 may be implemented as a stand-alone network element, or may include a module associated with, integrated with, or co-located with another network element. Such network elements may include, but are not limited to, a SIP-SS7 gateway, a media gateway controller, a softswitch, a session border control function (SBC), a PSTN breakout gateway control function (BGCF), a SIP server, an application server, and the like.

As illustrated in FIG. 3, a SIP/SS7 gateway 102 (which may be associated with a softswitch/MGC) is adapted to receive a SIP INVITE call setup message. SIP-SS7 gateway 102 translates the SIP INVITE message into an associated SS7 ISUP IAM message. SIP-SS7 gateway 102 also generates and associates a TTN (e.g., POTS number, mobile number, MSISDN, etc.) with a SIP calling subscriber identifier (e.g., a SIP "From" address/calling subscriber uniform resource identifier (URI)). For example, the SIP calling subscriber identifier comprises the subscriber's name, "Robby Benedyk", which is stored in a SIP "Display" parameter in the received SIP INVITE message. The TTN is included in the ISUP IAM message generated by gateway 102. In this example, gateway 102 also includes the calling subscriber's name information in the ISUP IAM message. In another example, if the received SIP INVITE message does not include the calling subscriber's name (e.g., Robby Benedyk) in the Display parameter, the gateway 102 may include a SIP URI or other subscriber identifier associated with the calling party in the ISUP IAM message.

The ISUP IAM is then routed via STP 104, which is associated with a CIF module 112, towards the terminating switching office or network element (e.g., PSTN end office, SSP, cellular mobile switching center, etc.). STP 104 receives the IAM and extracts the TTN and subscriber identifier (i.e., calling party name) from the IAM. The TTN and subscriber identifier may be stored in local cache 114, or in an external database by CIF 112. In one embodiment, the subscriber identifier is removed from the IAM before the message is routed to the terminating switching office (e.g., SSP 106). In an alternate embodiment, the IAM (which includes the SIP calling subscriber identification information) is routed towards the terminating switching office without removing the subscriber identifier (i.e., SIP Display information). In the example shown in FIG. 3, CIF 112 removes the subscriber identifier prior to routing the IAM to the terminating switching office.

Upon receiving the IAM, the terminating switching office may initiate a CNAM query to an intelligent network (IN)/advanced intelligent network (AIN) CNAM database that is configured to maintain and distribute calling name information (e.g., subscriber name, country, state, city, zip code, etc.) associated with a calling subscriber. In a legacy switching environment, a terminating switching office is adapted to generate a CNAM query to an IN/AIN CNAM database that is generally accessible via SS7 or SIGTRAN. In one embodiment, the CNAM database may comprise an SCP.

It is appreciated that since a TTN is dynamically assigned to and associated with a SIP calling subscriber identifier (e.g., subscriber name, subscriber SIP address, SIP URL, etc.), traditional CNAM query/response mechanisms are inadequate since the aforementioned CNAM database to be queried is unaware of the temporary telephone number and its association to a SIP URI. In other words, if the MSC or SSP utilizes the TTN as a calling party number in a CNAM query to a CNAM SCP, the CNAM SCP would have no calling name information provisioned for the dynamically assigned TTN.

As indicated in FIG. 3, the terminating switching office generates a CNAM query that includes the TTN obtained from the received ISUP IAM message. In one embodiment, the CNAM query is routed to STP 104 as a "route-on-global title" message. In one embodiment, a GTT subsystem (not shown) on STP 104 receives the CNAM query and examines the global title address (GTA). The GTT subsystem identifies the GTA as being a TTN previously assigned by SIP-SS7 gateway 102. The GTT subsystem may then access local cache 114 using the TTN value (or alternatively, the GTA value), and retrieves the associated SIP calling subscriber identifier. In one embodiment, a CNAM response message is generated by CIF 112 and the retrieved SIP calling subscriber information (i.e., subscriber name information) is included in the CNAM response message. The CNAM response message is returned to the querying terminating switching office, thereby providing the requested CNAM information. Notably, the originally intended database is never accessed. As such, STP 104 is adapted to respond on behalf of an IN/AIN CNAM database in cases where the database does not contain the requested calling name information for a SIP calling subscriber.

In an alternate embodiment, the terminating switching office may generate a CNAM query that is MTP routed (i.e., not routed using global title routing). Specifically, the CNAM query message may be addressed directly to a CNAM database which is intercepted by STP 104. For example, STP 104 may be adapted to recognize CNAM query messages containing a TTN or any number that is not a TTN (e.g., a "non-temporary telephone number"). Once intercepted, CIF processing is performed in a manner similar to that described with respect to the global title routed embodiment. In yet another embodiment, the CNAM query may be addressed directly to a subsystem of the STP, which is adapted to process the query and either respond to the querying switching office or to relay the CNAM query to the appropriate IN/AIN CNAM SCP.

Figure 4:
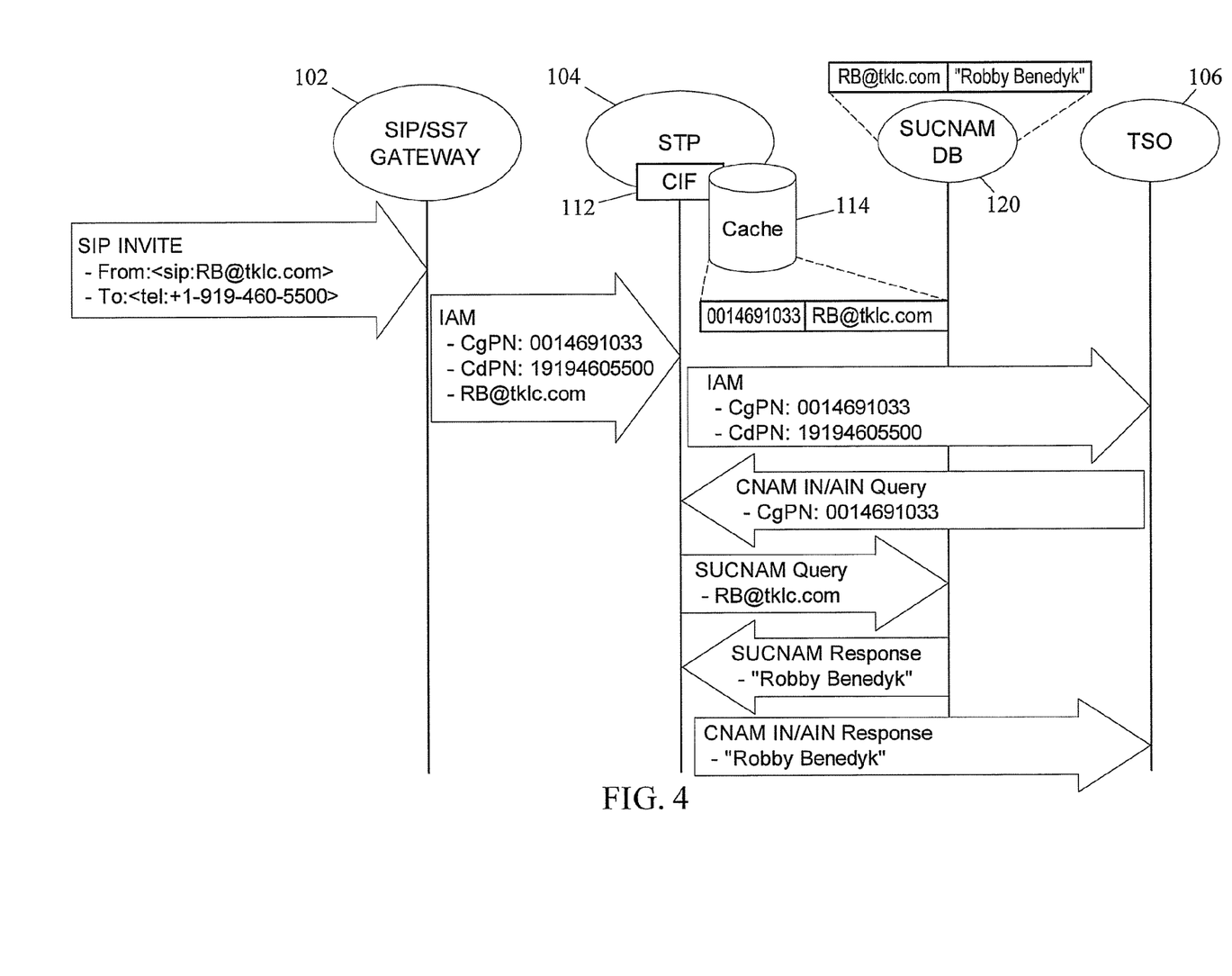
FIG. 4 is a call flow diagram of communicating CNAM services for SIP originated calls terminating in a circuit switched network using a SIP-URI CNAM database according to an embodiment of the subject matter described herein.

FIG. 4 depicts an exemplary call flow that depicts the situation where the SIP INVITE received by SIP/SS7 gateway 102 does not include calling party name display information. In this case, SIP/SS7 gateway 102 may associate or map a TTN (e.g., POTS number, mobile number, MSISDN, etc.) with the SIP calling subscriber address or other SIP URI. The TTN may be included in the ISUP IAM message generated by SIP/SS7 gateway 102. In this example, SI P/SS7 gateway 102 also includes the SIP calling subscriber address (e.g., SIP "From" URI parameter information) in the ISUP IAM message.

The ISUP IAM may then be routed via STP 104 towards the terminating switching office (e.g., PSTN end office, SSP, cellular mobile switching center, etc.). In one embodiment, STP 104 may intercept the ISUP IAM, and subsequently extract the TTN and SIP calling subscriber address information from the IAM. The TTN and SIP calling subscriber address information are cached at STP 104 by CIF 112. In one embodiment, the SIP calling subscriber address information is removed from the IAM before routing the IAM towards the terminating switching office. In an alternate embodiment, the IAM (which includes the SIP calling subscriber address) is routed towards the terminating switching office without removing the subscriber address. In the example shown in FIG. 4, CIF 112 removes the subscriber identifier (e.g., SIP URI information) prior to routing the message to the terminating switching office 106.

Upon receiving the IAM, terminating switching office initiates a CNAM query to a conventional CNAM database (not shown) that is adapted to maintain and/or distribute calling name information (e.g., subscriber name, country, state, city, zip code, etc.) associated with a calling SIP subscriber. In a legacy switching environment, a terminating switching office is adapted to generate a CNAM query to CNAM SCP that is generally accessible via SS7 or SIGTRAN.

As mentioned above, since a TTN is dynamically assigned to or associated with a SIP calling subscriber address, traditional CNAM query/response mechanisms are inadequate, as the queried CNAM database is unaware of the temporary telephone number and its association to a SIP URI. Specifically, if the terminating switching office used the TTN in a CNAM query to a CNAM SCP, the CNAM SCP would have no calling name information provisioned for the dynamically assigned TTN.

Continuing with the above example, the terminating switching office generates a CNAM query that includes the TTN obtained from the received ISUP IAM message. In one embodiment, the CNAM query is routed to STP 104 as a "route-on-global title" message. In this case, a GTT subsystem on STP 104 receives the CNAM query and examines the GTA. The GTT subsystem identifies the "calling party number" as being a temporary telephone number assigned by SIP-SS7 gateway 102. The GTT subsystem may then access cache 114 using the GTA/TTN value and may retrieve the associated SIP calling subscriber identifier (i.e., SIP URI information). Since CIF 112 was not able to cache the display information associated with the TTN, CIF 112 is adapted to generate a query message to a server/database that contains a mapping of SIP URIs and their associated subscriber name information (e.g., name, country, state, city, zip code, etc.). In one embodiment, the database includes a SIP URI calling name database (SUCNAM) 120. SUCNAM database 120 may be adapted to receive the CIF generated query and respond with calling name information associated with the SIP URI. In one embodiment, CIF 120 receives the SUCNAM response, extracts the SIP calling name information, and generates a CNAM response to the original CNAM query.

Notably, the CNAM response message generated by CIF 120 may include the retrieved calling name/display name information. The CNAM response message is then sent to the terminating switching office, thereby providing the requested CNAM information. As such, STP 104 (or a subsystem associated with the STP) may be adapted to respond on behalf of a conventional CNAM database 122 in cases where the CNAM database would not contain the requested calling name information for a SIP calling subscriber.

In an alternate embodiment, the terminating switching office may generate a CNAM query that is MTP routed (i.e., not routed using global title routing). In this case, the query message may be addressed directly to a CNAM SCP or service provider, and STP 104 may intercept the CNAM query message. Once intercepted, CIF processing is performed in a manner similar to that described with respect to the global title routed embodiment.

Figure 5:
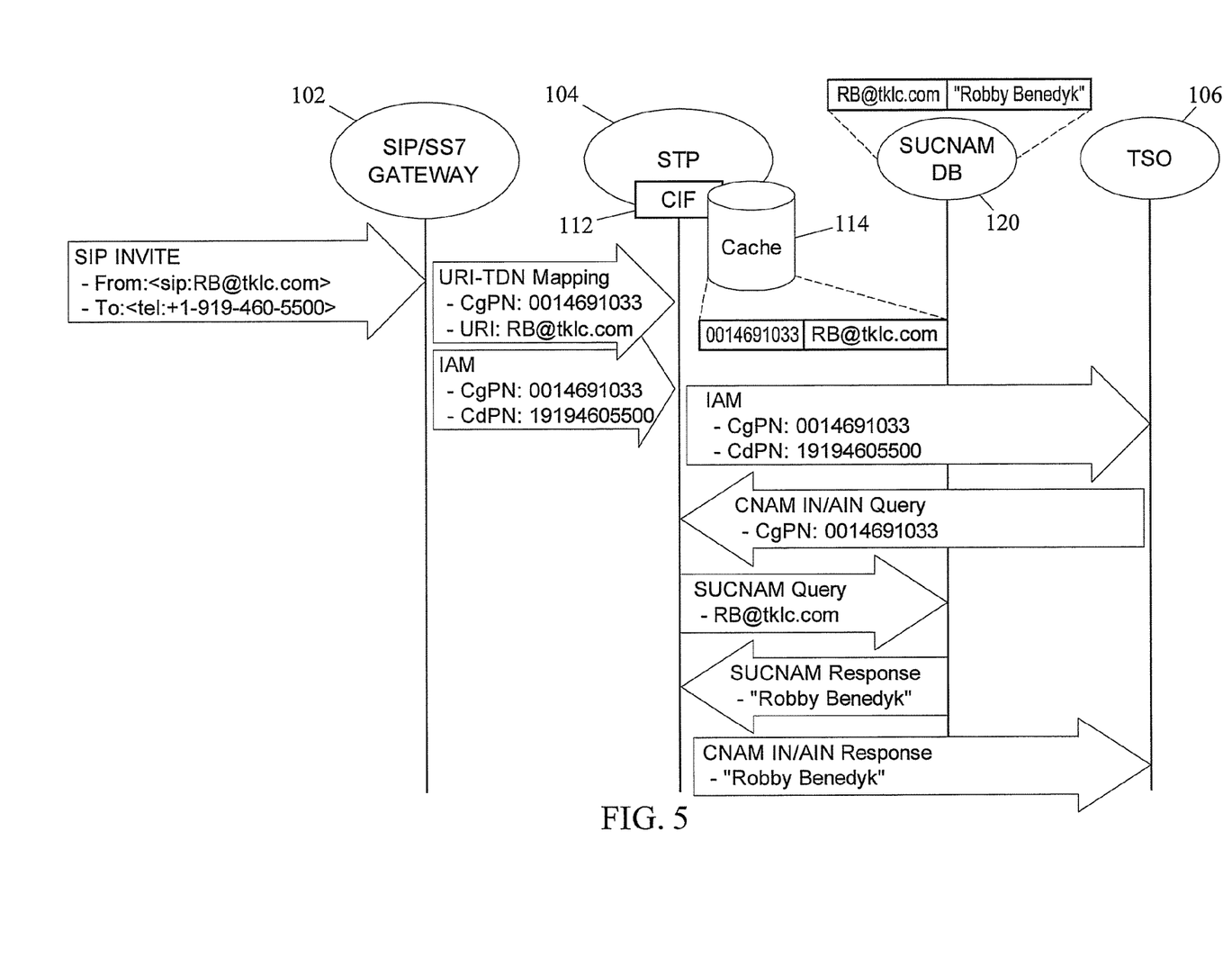
FIG. 5 is a call flow diagram of communicating CNAM services for SIP originated calls terminating in a circuit switched network by utilizing a non-call setup message according to an embodiment of the subject matter described herein.

FIG. 5 is an embodiment that is similar to the embodiment illustrated in FIG. 4. However, in this figure, the SIP URI (or display) information is communicated to STP 104 via a separate message. In the previous embodiments, the URI (and display) information is communicated between SIP-SS7 gateway 102 and CIF 112 via the ISUP IAM. In the embodiment shown in FIG. 5, gateway 102 communicates the SIP URI (or SIP calling subscriber identifier) information using some other message other than a call setup message (i.e., a "non-call setup message"). The message may include at least one of a SS7 MAP, SS7 TCAP, SIP, DIAMETER, XML, SOAP, or other protocol-based message. In one embodiment, the non-call setup message is a generic URI-TDN mapping message that includes both the TTN and the SIP subscriber address.

Figure 6:
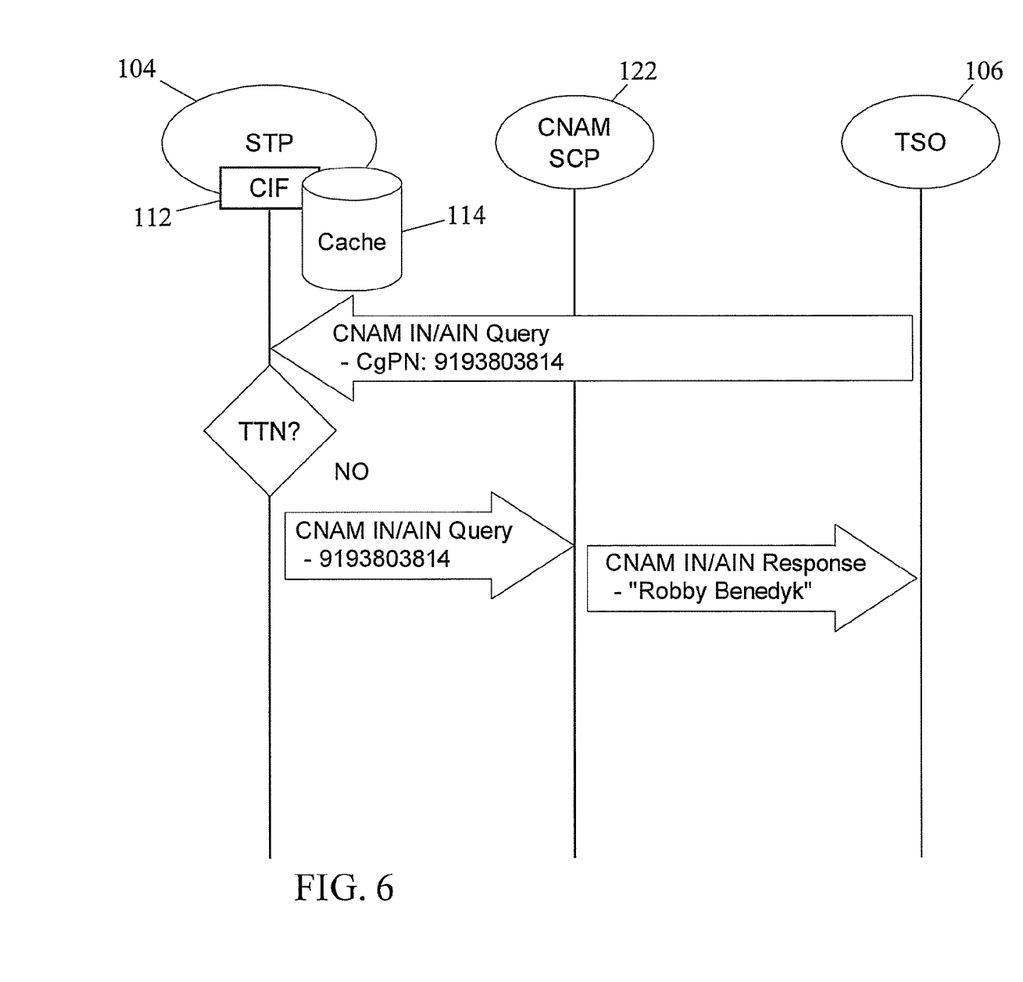
FIG. 6 is a call flow diagram of communicating CNAM services for a normal telephone call terminating in a circuit switched network according to an embodiment of the subject matter described herein.

FIG. 6 illustrates an exemplary call flow where the legacy terminating switching office generating a CNAM query and launching the query towards an IN/AIN CNAM SCP in the event the CNAM query includes a valid telephone number instead of a TTN. Specifically, STP 104 may be adapted to examine the calling subscriber number specified in the received CNAM query and in response to determining that the number is not a TTN, CIF 112 routes the CNAM query to a conventional CNAM SCP 122 or some other external database/server that contains the requested subscriber name information (e.g., HSS, SIP subscriber information database, etc.). CNAM SCP 122 then provides the CNAM response with the calling subscriber name to the terminating switching office via a CNAM response message.

Figure 7:
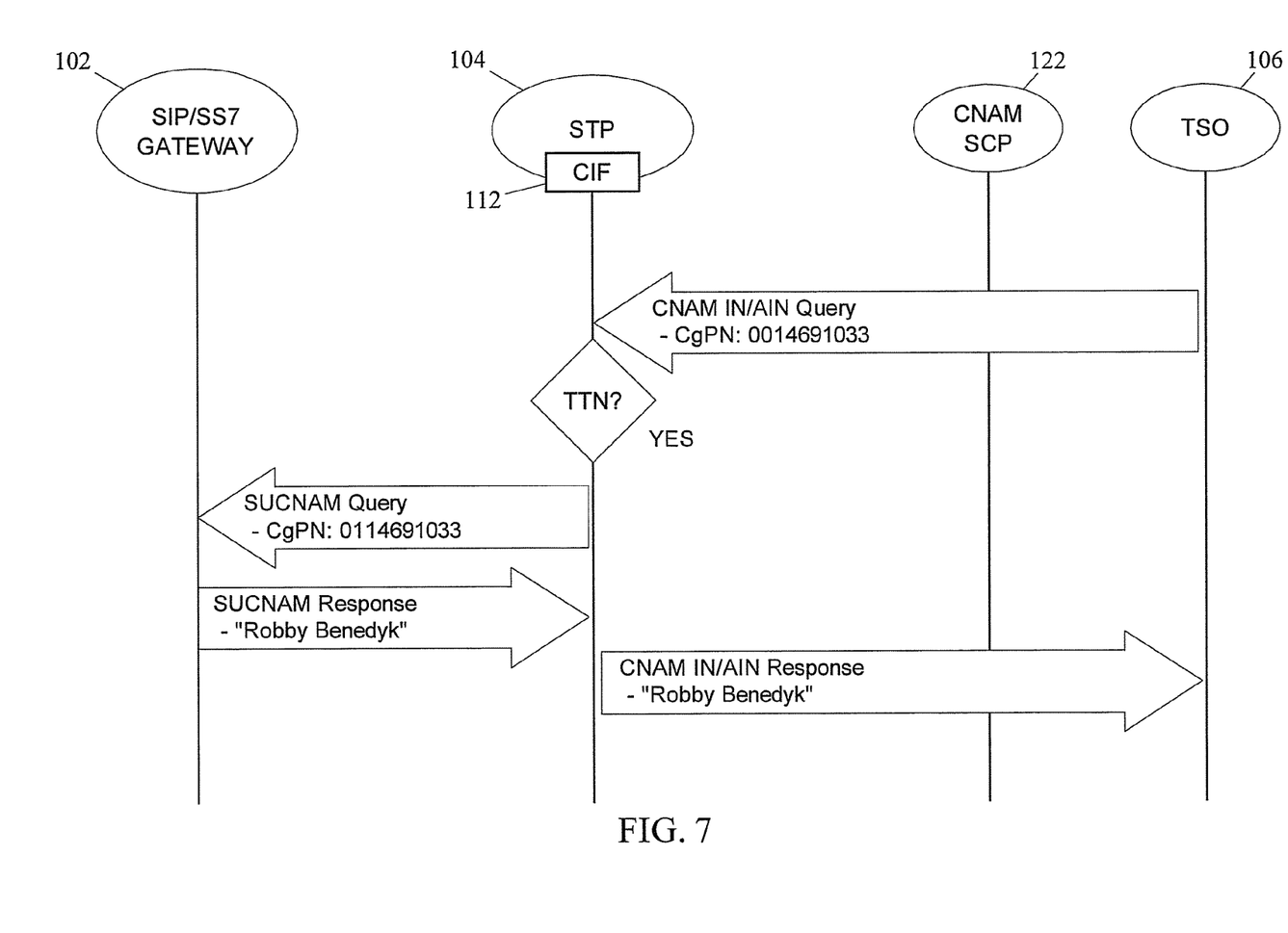
FIG. 7 is a call flow diagram of communicating CNAM services for SIP originated calls terminating in a circuit switched network by querying the SIP-SS7 gateway according to an embodiment of the subject matter described herein.

FIG. 7 depicts an exemplary call flow where SIP-SS7 gateway 102 is configured to receive queries from STP 104. In one embodiment, the terminating switching office generates and launches a CNAM query towards CNAM SCP 122. STP 104 is adapted to intercept the query and examine the calling subscriber number contained within the message. In response to determining that the number is a TTN, STP 104 routes a SUCNAM query to SIP-SS7 gateway 102 (since the SIP-SS7 gateway 102 made and stored the original TTN and SIP calling subscriber identifier association). In one embodiment, the processing unit in Si P-SS7 gateway 102 may then provide a SUCNAM response containing the calling party name information to STP 104, which in turn includes the information in a CNAM response to the terminating switching office.

Figure 8:
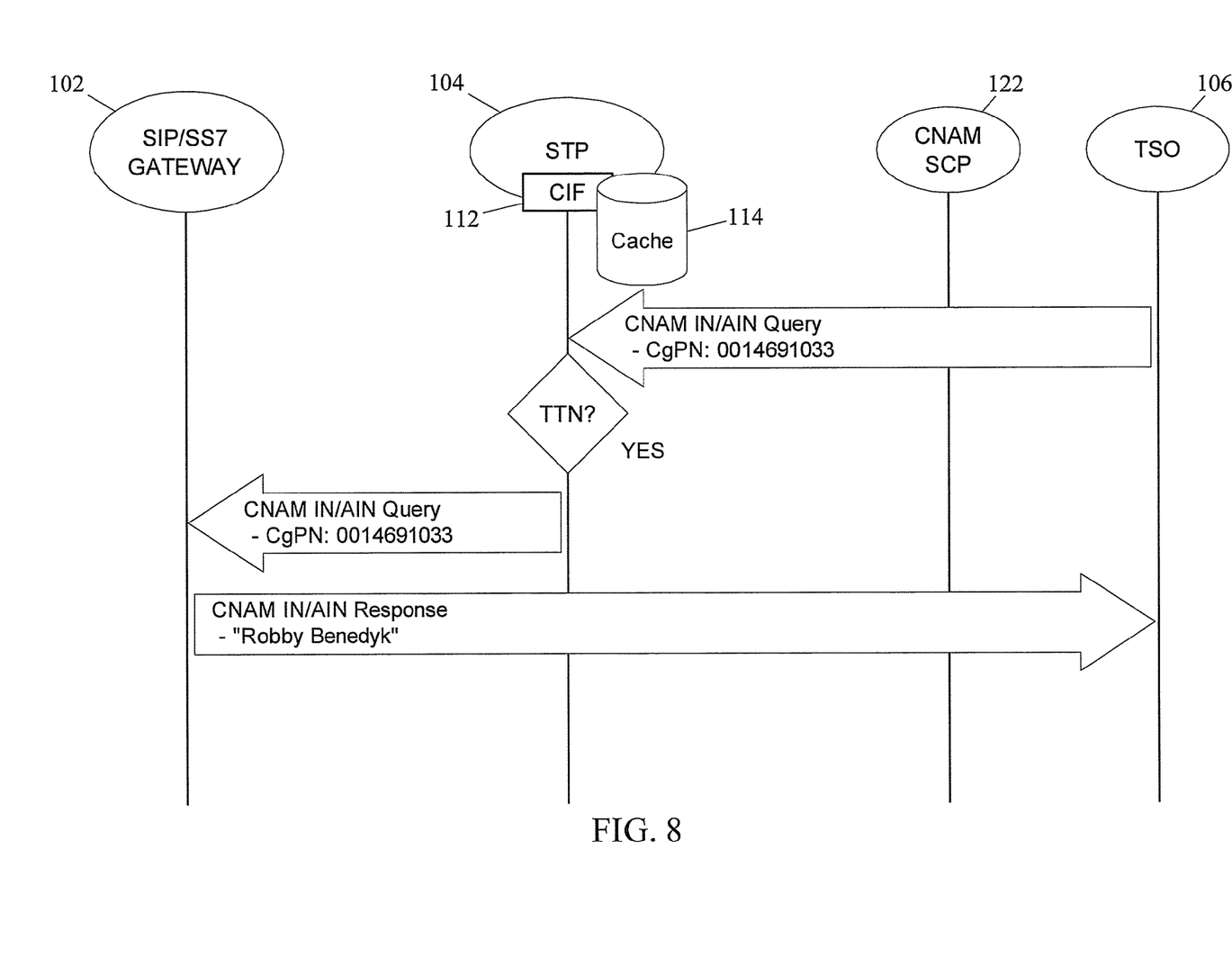
FIG. 8 is a call flow diagram of communicating CNAM services for SIP originated calls terminating in a circuit switched network by forwarding CNAM queries to a SIP-SS7 gateway according to an embodiment of the subject matter described herein.

FIG. 8 depicts an exemplary call flow where SIP-SS7 gateway 102 acts as a direct SIP CNAM information provider. In FIG. 8, SIP-SS7 gateway 102 responds directly to a CNAM query originated from a terminating switching office and forwarded by STP 104. In one embodiment, STP 104 is adapted to intercept the query message and examine the calling subscriber number contained within the message. In response to determining that the number is a TTN, STP 104 forwards the CNAM query to SIP-SS7 gateway 102. In one embodiment, the processing unit in SIP-SS7 gateway 102 may then provide a CNAM response containing the calling party name information directly to the terminating switching office.

Figure 9:
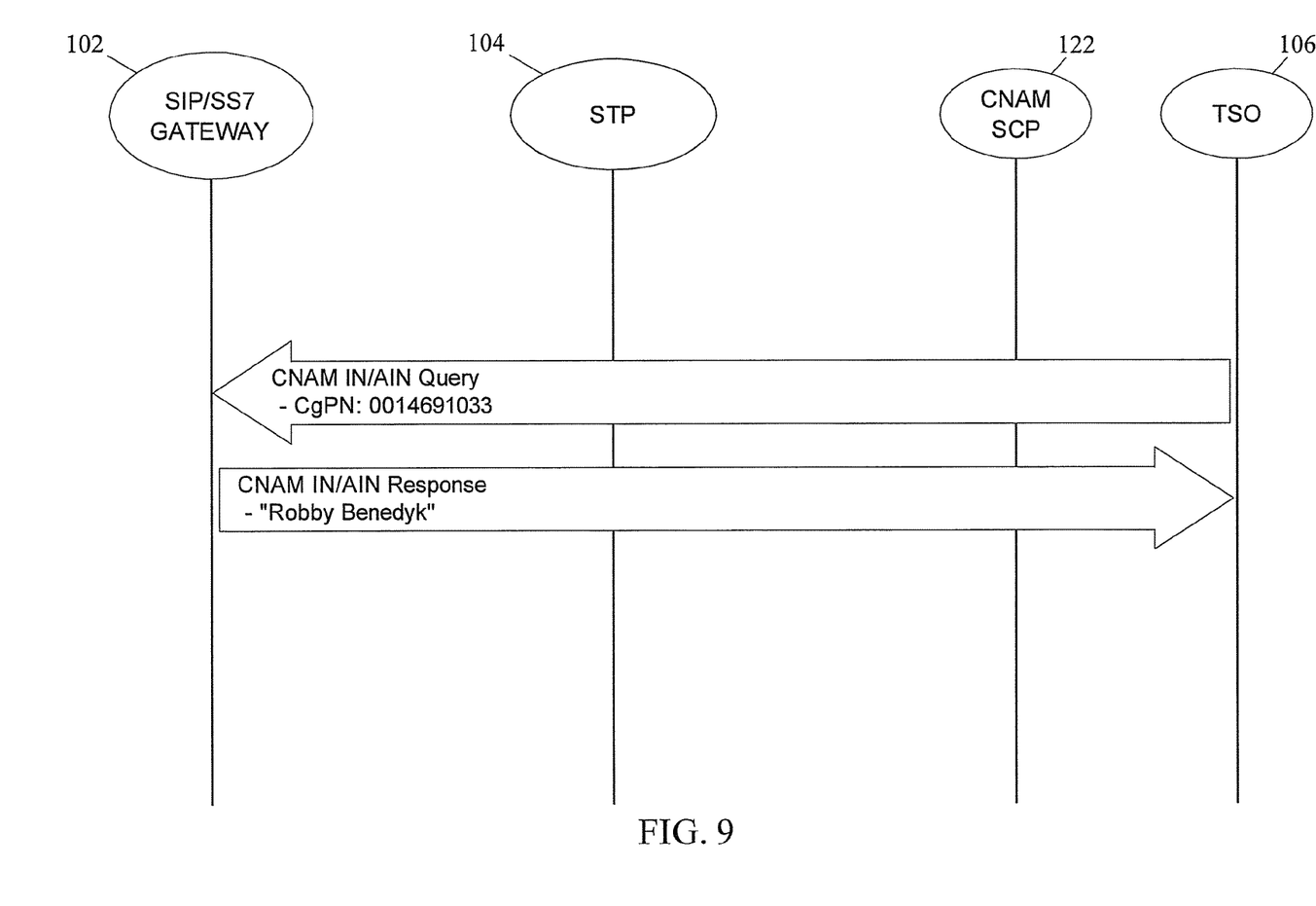
FIG. 9 is a call flow diagram of communicating CNAM services for SIP originated calls terminating in a circuit switched network wherein the CNAM query is directly received by a SIP-SS7 gateway according to an embodiment of the subject matter described herein.

FIG. 9 depicts an exemplary call flow where SIP-SS7 gateway 102 acts as a direct SIP CNAM information provider, without the involvement of STP 104. In one embodiment, SIP-SS7 gateway 102 responds directly to a CNAM query containing a TTN. For example, SIP-SS7 gateway 102 may receive the CNAM query, determine that the calling party number is a TTN, and generate a CNAM response containing the calling party name information. In one embodiment, the processing unit SIP-SS7 gateway 102 may then provide the CNAM response containing the calling party name information directly to the requesting terminating switching office.

Figure 10:
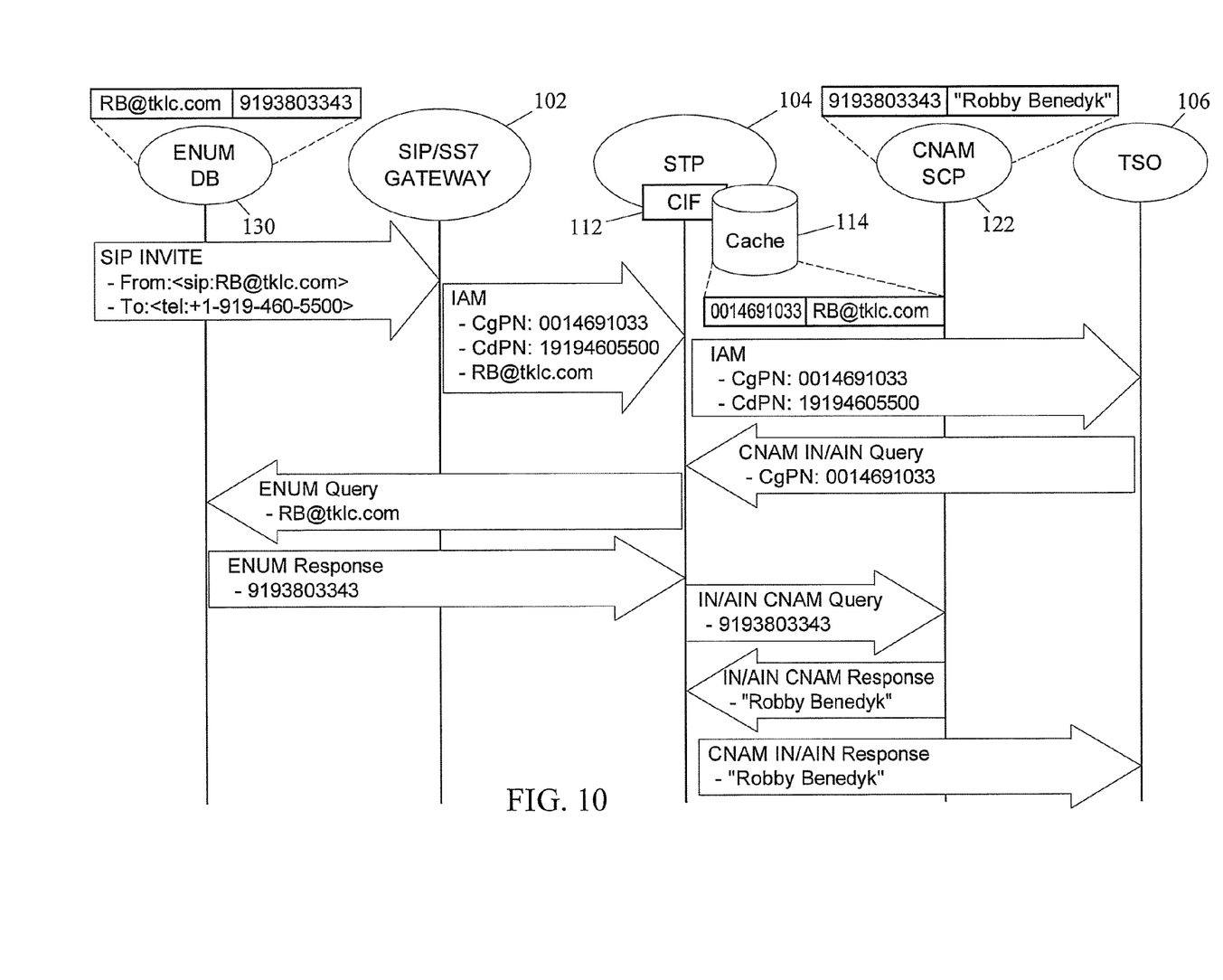
FIG. 10 is a call flow diagram of communicating CNAM services for SIP originated calls terminating in a circuit switched network by querying an ENUM database according to an embodiment of the subject matter described herein.

FIG. 10 depicts an exemplary call flow where an ENUM database is used to obtain a subscriber telephone number to be used for a CNAM database query. In one embodiment, STP 104 receives a CNAM query containing a TTN and accesses local cache 114 to obtain an associated SIP URI (e.g., subscriber's SIP address) associated with the TTN. STP 104 subsequently sends an ENUM query message (e.g., a reverse ENUM lookup request) to ENUM server/database 130. ENUM database 130 may include a database that maps/associates an E.164 formatted mobile telephone number to an associated SIP URI(s). Upon receiving the query message, ENUM database 130 may perform a reverse ENUM lookup by using the SIP URI to obtain an associated E.164 telephone number. An ENUM response message containing the obtained telephone number is subsequently sent to CIF 112. CIF 112 then generates and sends a normal CNAM query message that includes the obtained telephone number to a conventional CNAM database 122. CNAM database 122 may then return the calling party information (or other CNAM information) associated with the E.164 telephone number to CIF 112 in a CNAM response message. Afterwards, CIF 112 provides the terminating switching office (which originally requested the information via a CNAM query to STP 104) with the telephone number via a CNAM response message.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for communicating calling name (CNAM) identification information associated with a session initiation protocol (SIP) originated call to a circuit switched network, the method comprising:

at a SIP-SS7 gateway:
receiving a SIP call setup message that includes a SIP calling subscriber identifier information;
associating a telephone number with the SIP calling subscriber identifier information;
generating an SS7 call setup message associated with the SIP call setup message, wherein the SS7 call setup message includes the telephone number;
communicating the telephone number and SIP calling subscriber identifier information to a calling name interworking function (CIF) module;
at the CIF module:
storing the telephone number and the associated SIP calling subscriber identifier information in a local cache;
receiving a CNAM query message containing the telephone number from a terminating switching office;
transmitting a CNAM response message to the terminating switching office including SIP calling subscriber identifier information; and
wherein storing the telephone number includes intercepting the SS7 call setup message at the CIF module, extracting the telephone number from the SS7 call setup message, and storing the telephone number with the SIP calling subscriber identifier information in the local cache.

2. The method of claim 1 wherein the SIP calling subscriber identifier information includes at least one of a uniform resource identifier (URI), a subscriber name, a city, a state, a country and a calling party type identification information that is associated with a SIP subscriber.

3. The method of claim 1 wherein transmitting the CNAM response message includes utilizing the telephone number to obtain the associated SIP calling subscriber identifier information, and sending a CIF originated CNAM response message to the terminating switching office including the SIP calling subscriber identifier information.

4. The method of claim 3 wherein utilizing the telephone number includes using the telephone number to obtain the associated SIP calling subscriber identifier information from the local cache.

5. The method of claim 3 wherein utilizing the telephone number to obtain the associated SIP calling subscriber identifier information includes:
transmitting a query message including a SIP subscriber address to an external database containing calling party name information associated with the SIP subscriber addresses;
receiving a response message from the external database; and
transmitting a SIP subscriber address to the terminating switching office if associated calling party name information is not included in the response message.

6. The method of claim 1 wherein the CIF module is communicatively coupled to a signal transfer point (STP).

7. The method of claim 1 wherein the SIP calling subscriber identifier information includes a calling party name and wherein the SS7 call setup message includes the calling party name.

8. The method of claim 1 wherein communicating the telephone number and the SIP calling subscriber identifier information includes transmitting the SS7 call setup message containing the telephone number and a separate non-call setup message that contains the SIP calling subscriber identifier information to the CIF module.

9. The method of claim 1 wherein the terminating switching office includes at least one of a mobile service center (MSC) and a service switching point (SSP).

10. The method of claim 1 further comprising forwarding a CNAM query received from the terminating switching office to a CNAM database if the telephone number in the CNAM query comprises a non-temporary telephone number.

11. A method for communicating calling name (CNAM) identification information associated with a session initiation protocol (SIP) originated call to a circuit switched network, the method comprising:
  at a SIP-SS7 gateway:
    receiving a SIP call setup message that includes a SIP calling subscriber identifier information;
    associating a telephone number with the SIP calling subscriber identifier information;
    generating an SS7 call setup message associated with the SIP call setup message, wherein the SS7 call setup message includes the telephone number;
    communicating the telephone number and SIP calling subscriber identifier information to a calling name interworking function (CIF) module;
  at the CIF module:
    storing the telephone number and the associated SIP calling subscriber identifier information in a local cache;
    receiving a CNAM query message containing the telephone number from a terminating switching office;
    transmitting a CNAM response message to the terminating switching office including SIP calling subscriber identifier information; and
    further comprising, after storing the telephone number, transmitting a second call setup message to the terminating switching office, wherein the second call setup message contains the telephone number.

12. The method of claim 11 wherein transmitting a second call setup message includes modifying, at the CIF, the SS7 call setup message to remove the SIP calling subscriber identifier information, and sending the modified SS7 call setup message to the terminating switching office.

13. A method for communicating calling name (CNAM) identification information associated with a session initiation protocol (SIP) originated call to a circuit switched network, the method comprising:
  at a SIP-SS7 gateway:
    receiving a SIP call setup message that includes a SIP calling subscriber identifier information;
    associating a telephone number with the SIP calling subscriber identifier information;
    generating an SS7 call setup message associated with the SIP call setup message, wherein the SS7 call setup message includes the telephone number;
    communicating the telephone number and SIP calling subscriber identifier information to a calling name interworkinq function (CIF) module;
  at the CIF module:
    storing the telephone number and the associated SIP calling subscriber identifier information in a local cache;
    receiving a CNAM query message containing the telephone number from a terminating switching office;
    transmitting a CNAM response message to the terminating switching office including SIP calling subscriber identifier information;
    wherein transmitting the CNAM response message includes utilizing the telephone number to obtain the associated SIP calling subscriber identifier information, and sending a CIF originated CNAM response message to the terminating switching office including the SIP calling subscriber identifier information; and
    wherein utilizing the telephone number includes: transmitting a CIF originated query message that includes a subscriber SIP address to a database located externally from the STP, and receiving a response message containing SIP subscriber name information associated with the subscriber SIP address.

14. A method for communicating calling name (CNAM) identification information associated with a session initiation protocol (SIP) originated call to a circuit switched network, the method comprising:
  at a SIP-SS7 gateway:
    receiving a SIP call setup message that includes a SIP calling subscriber identifier information;
    associating a telephone number with the SIP calling subscriber identifier information;
    generating an SS7 call setup message associated with the SIP call setup message, wherein the SS7 call setup message includes the telephone number;
    communicating the telephone number and SIP calling subscriber identifier information to a calling name interworking function (CIF) module;
  at the CIF module:
    storing the telephone number and the associated SIP calling subscriber identifier information in a local cache;
    receiving a CNAM query message containing the telephone number from a terminating switching office;
    transmitting a CNAM response message to the terminating switching office including SIP calling subscriber identifier information;
    wherein transmitting the CNAM response message includes utilizing the telephone number to obtain the associated SIP calling subscriber identifier information, and sending a CIF originated CNAM response message to the terminating switching office including the SIP calling subscriber identifier information; and
    wherein utilizing a telephone number includes transmitting a query message containing the telephone number to the SIP-SS7 gateway, and receiving a response message containing the associated SIP calling subscriber identifier information at the CIF module.

15. A method for communicating calling name (CNAM) identification information associated with a session initiation protocol (SIP) originated call to a circuit switched network, the method comprising:
  at a SIP-SS7 gateway:
    receiving a SIP call setup message that includes a SIP calling subscriber identifier information;
    associating a telephone number with the SIP calling subscriber identifier information;
    generating an SS7 call setup message associated with the SIP call setup message, wherein the SS7 call setup message includes the telephone number;
    communicating the telephone number and SIP calling subscriber identifier information to a calling name interworking function (CIF) module;
  at the CIF module:
    storing the telephone number and the associated SIP calling subscriber identifier information in a local cache;
    receiving a CNAM query message containing the telephone number from a terminating switching office;
    transmitting a CNAM response message to the terminating switching office including SIP calling subscriber identifier information;

wherein transmitting the CNAM response message includes utilizing the telephone number to obtain the associated SIP calling subscriber identifier information, and sending a CIF originated CNAM response message to the terminating switching office including the SIP calling subscriber identifier information; and wherein utilizing a telephone number includes forwarding the CNAM query message containing the telephone number to the SIP-SS7 gateway, and transmitting a response message containing the associated SIP calling subscriber identifier information to the terminating switching office from the SIP-SS7 gateway.

16. A method for communicating calling name (CNAM) identification information associated with a session initiation protocol (SIP) originated call to a circuit switched network, the method comprising:

at a SIP-SS7 gateway:

receiving a SIP call setup message that includes a SIP calling subscriber identifier information;

associating a telephone number with the SIP calling subscriber identifier information;

generating an SS7 call setup message associated with the SIP call setup message, wherein the SS7 call setup message includes the telephone number;

communicating the telephone number and SIP calling subscriber identifier information to a calling name interworking function (CIF) module;

at the CIF module:

storing the telephone number and the associated SIP calling subscriber identifier information in a local cache;

receiving a CNAM query message containing the telephone number from a terminating switching office;

transmitting a CNAM response message to the terminating switching office including SIP calling subscriber identifier information;

wherein transmitting the CNAM response message includes utilizing the telephone number to obtain the associated SIP calling subscriber identifier information, and sending a CIF originated CNAM response message to the terminating switching office including the SIP calling subscriber identifier information; and wherein utilizing the telephone number includes:

transmitting an ENUM query message containing a SIP URI to an ENUM database;

receiving an ENUM response message from an ENUM database containing an E.164 telephone number associated with the SIP URI;

sending a CIF originated CNAM query message to a CNAM database containing the E.164 telephone number, and receiving a CNAM response message at the CIF from the CNAM database containing the SIP calling subscriber identifier information associated with the E.164 telephone number.

17. A session initiation protocol (SIP)-SS7 gateway for communicating calling name (CNAM) information associated with a SIP originated call to a circuit switched network, comprising:

a SIP network interface for receiving a SIP call setup message that includes SIP calling subscriber identifier information;

a processing unit for generating a telephone number, associating the telephone number with the SIP calling subscriber identifier information, generating a second call setup message associated with the SIP call setup message that includes the telephone number, and communicating the telephone number and SIP calling subscriber identifier information to a CNAM interworking function (CIF) module; and wherein the processing unit is further configured to transmit the SS7 call setup message containing the telephone number and a separate non-call setup message that contains the SIP calling subscriber identifier information to the CIF module.

18. The SIP-SS7 gateway of claim 17 wherein the processing unit is configured to provide a CNAM response message containing calling party name information to a terminating switching office in response to receiving a forwarded CNAM query message from the CIF module.

19. A session initiation protocol (SIP)-SS7 gateway for communicating calling name (CNAM) information associated with a SIP originated call to a circuit switched network, comprising:

a SIP network interface for receiving a SIP call setup message that includes SIP calling subscriber identifier information;

a processing unit for generating a telephone number, associating the telephone number with the SIP calling subscriber identifier information, generating a second call setup message associated with the SIP call setup message that includes the telephone number, and communicating the telephone number and SIP calling subscriber identifier information to a CNAM interworking function (CIF) module; and wherein the processing unit is configured to provide a response message containing calling party name information to the CIF module in response to receiving a query message from the CIF module.

20. A session initiation protocol (SIP)-SS7 gateway for communicating calling name (CNAM) information associated with a SIP originated call to a circuit switched network, comprising:

a SIP network interface for receiving a SIP call setup message that includes SIP calling subscriber identifier information;

a processing unit for generating a telephone number, associating the telephone number with the SIP calling subscriber identifier information, generating a second call setup message associated with the SIP call setup message that includes the telephone number, and communicating the telephone number and SIP calling subscriber identifier information to a CNAM interworking function (CIF) module; and wherein the processing unit is further configured to provide a CNAM response message containing calling party name information to a terminating switching office in response to receiving a forwarded CNAM query message from the terminating switching office.

21. A signal transfer point (STP) for communicating calling name (CNAM) information associated with a session initiation protocol (SIP) originated call to a circuit switched network, comprising:

a network interface for receiving a telephone number and an associated SIP calling subscriber identifier information from a SIP-SS7 gateway;

a CNAM interworking function (CIF) module for extracting the telephone number from the message, for storing the telephone number with the SIP calling subscriber identifier information in a local cache associated with the STP, receiving a CNAM query message containing the telephone number from a terminating switching office, and transmitting a CNAM response message including the SIP calling subscriber identifier information; and wherein the CIF module is further configured to intercept a call setup message at the CIF module, and extract the telephone number from the call setup message, and store the telephone number with the SIP calling subscriber identifier information in the local cache.

22. The STP of claim 21 wherein the CIF module is further configured to transmit a modified call signaling message to the terminating switching office, wherein the modified call signaling message includes the telephone number as the calling party number.

23. The STP of claim 21 wherein the CIF module is further configured to utilize the telephone number to obtain the associated SIP calling subscriber identifier information from the local cache in response to receiving a CNAM query.

24. A signal transfer point (STP) for communicating calling name (CNAM) information associated with a session initiation protocol (SIP) originated call to a circuit switched network, comprising:

a network interface for receiving a telephone number and an associated SIP calling subscriber identifier information from a SIP-SS7 gateway;

a CNAM interworking function (CIF) module for extracting the telephone number from the message, for storing the telephone number with the SIP calling subscriber identifier information in a local cache associated with the STP, receiving a CNAM query message containing the telephone number from a terminating switching office, and transmitting a CNAM response message including the SIP calling subscriber identifier information;

wherein the CIF module is further configured to utilize the telephone number to obtain the associated SIP calling subscriber identifier information from the local cache in response to receiving a CNAM query; and wherein the CIF module is further configured to utilize the associated SIP calling subscriber identifier information obtained from the local cache to send a query message to an external database to obtain calling party name information.

25. The STP of claim 24 wherein the CIF module is further configured to transmit a CNAM response message to the terminating switching office, wherein the CNAM response message includes the calling party name information.

26. The STP of claim 25 wherein the network interface is further configured to receive a call setup message containing the telephone number and a separate non-call setup message that contains the SIP calling subscriber identifier information.

27. A non-transitory computer readable medium having stored thereon computer executable instructions that when executed by a processor of a computer control the computer to perform steps comprising:

receiving, at a SIP-SS7 gateway, a SIP call setup message that includes SIP calling subscriber identifier information;

associating a telephone number with the SIP calling subscriber identifier information;

generating an SS7 call setup message associated with the SIP call setup message, wherein the SS7 call setup message includes the telephone number;

communicating the telephone number and SIP calling subscriber identifier information to a calling name interworking function (CIF) module;

storing, at the CIF module, the telephone number and the associated SIP calling subscriber identifier information in a local cache;

receiving a CNAM query message containing the telephone number from a terminating switching office;

transmitting a CNAM response message to the terminating switching office including the SIP calling subscriber identifier information; and wherein storing the telephone number includes intercepting the SS7 call setup message at the CIF module, extracting the telephone number from the SS7 call setup message, and storing the telephone number with the SIP calling subscriber identifier information in the local cache.

* * * * *